United States Patent
Jaworski et al.

[11] Patent Number: 6,089,260
[45] Date of Patent: Jul. 18, 2000

[54] NESTED DUCKBILL CHECK VALVES

[75] Inventors: Thomas Jaworski; Peter M. Neumann, both of Racine, Wis.

[73] Assignee: S. C. Johnson & Son, Inc., Racine, Wis.

[21] Appl. No.: 09/394,797

[22] Filed: Sep. 10, 1999

[51] Int. Cl.[7] ................................................. F16K 15/00
[52] U.S. Cl. ........................ 137/512; 137/846; 137/512.4
[58] Field of Search ................................. 137/512.4, 512, 137/846; 222/494

[56] References Cited

U.S. PATENT DOCUMENTS

| | | |
|---|---|---|
| 2,322,631 | 6/1943 | Groeniger ............................ 137/512.4 |
| 2,772,817 | 12/1956 | Jauch ..................................... 222/207 |
| 3,365,240 | 1/1968 | Gordon . |
| 3,485,419 | 12/1969 | Taylor ..................................... 222/340 |
| 3,693,843 | 9/1972 | Perry et al. ............................ 137/846 |
| 3,855,995 | 12/1974 | Bentley ................................... 137/846 |
| 4,513,220 | 4/1985 | Togashi .................................. 137/512 |
| 4,729,401 | 3/1988 | Raines .................................... 137/512 |
| 4,756,982 | 7/1988 | McCartney, Jr. et al. .......... 137/512.4 |
| 4,945,945 | 8/1990 | Schmid ................................... 137/512 |
| 5,133,324 | 7/1992 | Michiaki ................................ 137/846 |
| 5,310,094 | 5/1994 | Martinez et al. ...................... 137/846 |
| 5,697,525 | 12/1997 | O'Reilly et al. . |
| 5,906,316 | 5/1999 | Gatzemeyer et al. . |
| 5,931,352 | 8/1999 | Dirr . |

*Primary Examiner*—Gregory L. Huson
*Assistant Examiner*—Joanne Y. Kim

[57] ABSTRACT

Disclosed herein are check valve assemblies with enhanced back flow protection. There are at least two duckbilled check valves, each having an inlet at one end and an elastomeric bill formed at an opposite end, the bill having opposed lips and an outlet openable by a flexing of the lips apart. The bill of the first duckbill check valve is telescoped into and retained in the inlet of the second duckbilled check valve (e.g. by a jam fit or snap fit connection). These assemblies can be positioned in compact conduits such as those found in garden hose outlet nozzles.

4 Claims, 2 Drawing Sheets

NESTED DUCKBILL CHECK VALVES

CROSS-REFERENCE TO RELATED APPLICATIONS

Not Applicable

STATEMENT REGARDING FEDERALLY SPONSORED RESEARCH/DEVELOPMENT

Not Applicable

BACKGROUND OF THE INVENTION

The present invention relates to check valve assemblies that provide enhanced protection against unwanted reverse flow through conduits.

A check valve is a type of valve that permits flow of a fluid in one direction while inhibiting reverse flow. Such valves are typically used to prevent contamination of plumbing systems. "Duckbilled" type check valves usually have a cylindrical base/inlet end that fits snugly into a conduit through which the fluid will be flowing. The outlet end of the valve tapers somewhat like the bill of a duck. There is a central bore extending through the valve between the entry and outlet. Normal fluid flow drives the flexible bill open to permit flow through the valve. Reverse flow drives the bill closed.

Prior art duckbilled check valves are available from many suppliers. Three such suppliers are Vernay Laboratories, Eagle-Picher and Moxness.

While duckbilled check valves have been used in a wide variety of applications, they are particularly well suited for use in nozzle assemblies that assist in dispensing actives (e.g. cleaners, fertilizers, herbicides, pesticides) from the end of a garden hose. See e.g. check valve 15 in U.S. Pat. No. 5,906,316. The disclosure of this patent and of all other publications referred to herein are incorporated by reference as if fully set forth herein.

However, some municipalities have recently enacted codes that require effective back flow protection even where a check valve is exposed to water supplies that contain grit or small rock fragments. The concern of these codes is that such solid materials may cause conventional check valves to temporarily jam in the open position (and thereby defeat the back flow protection of the valve before fluid flow can dislodge the blockage).

Multiple in-line check valves has been proposed to comply with the requirements of these codes (with the check valves spaced apart about a centimeter or so, in order that the valves not interfere with each other). While such structures would enhance back flow protection, they would render the portion of the ultimate product that contains this protection more bulky. This is a particular problem with compact structures such as garden hose outlet nozzles. Further, installing separate multiple check valves in such nozzles requires multiple installation operations, and may also require modification to the ultimate product (or additional components) to retain the check valves in an appropriately spaced configuration.

There is therefore a need for improved check valve assemblies.

BRIEF SUMMARY OF THE INVENTION

The invention provides a check valve assembly having two duckbilled check valves, each having an inlet at one end and a (preferably tapered) elastomeric bill formed at an opposite end, each bill having opposed lips and an outlet openable by a flexing of the lips apart. The bill of the first duckbill check valve is telescoped into and retained in the inlet of the second duckbilled check valve. By the term "tapered" we mean a structure that narrows in a bill-like fashion such as by sloping or by a rounded domed tapering.

In a preferred form the two check valves have essentially identical structure.

In another form the bill of the first duckbill check valve is held in a nested together configuration with the inlet of the second duckbilled check valve by a snap fit connection. The first duckbilled check valve can have a radially inwardly directed neck groove between its bill and inlet. The second duckbilled check valve can have a radially inwardly directed projection inside its inlet. The projection will then snap fit into the groove to interlock the parts.

In yet another aspect the invention provides such a check valve assembly where the first and second check valves are held in a nested together configuration by contact between axially directed surfaces of the valves. In this regard, the first check valve can have an axially directed surface that is jam fit against an axially directed surface of the second check valve.

The invention also provides methods of preventing back flow in a conduit. One positions a check valve assembly of the above kind in a conduit (e.g. preferably such that a radially outward surface of the check valve assembly is in sealing contact with the conduit).

The present invention provides a closure that enhances back flow protection without taking up unnecessary space in the final product. Further, because the check valves are interlockable, they can be stored, moved and installed as a unit. This facilitates automated installation of these check valve assemblies. Also, because multiple identical check valves are preferably used, there is no need to separately store or separately mold the two check valves.

Moreover, it should be appreciated that the individual check valve units can also be used separately. Thus, these designs provide twice the protection when needed, and when the extra level of protection is not needed the same subcomponent can function alone.

These and still other advantages of the present invention will be apparent from the description of the preferred embodiments which follow.

DETAILED DESCRIPTION OF THE INVENTION

Figure 1:
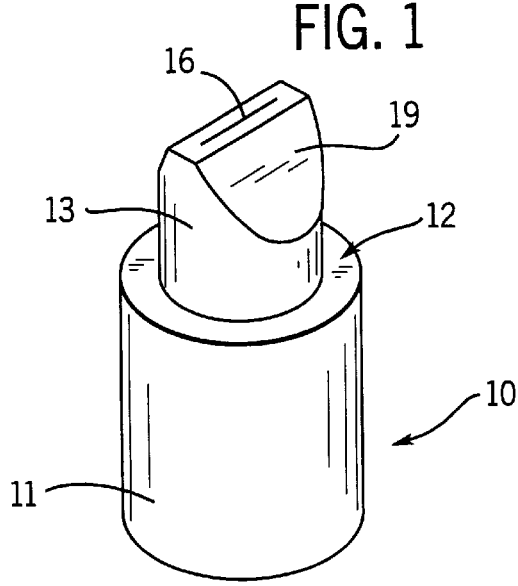
FIG. 1 is a perspective view of a duckbilled check valve that is useful in connection with the present invention.
Figure 2:
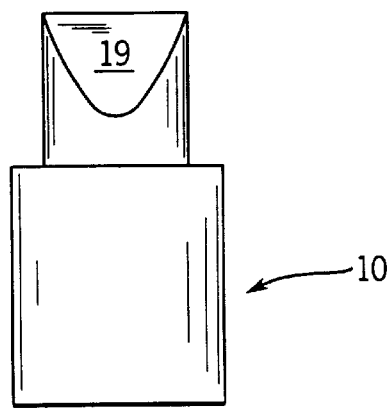
FIG. 2 is a front elevational view thereof, the rear elevational view being identical thereto.
Figure 4:
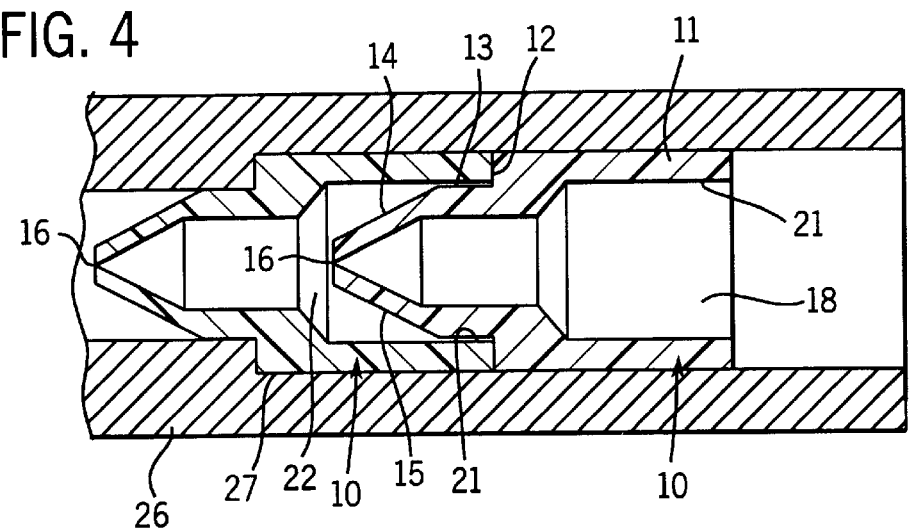
FIG. 4 is a vertical sectional view through a conduit that contains two of the nested duckbilled check valves in accordance with the present invention.

FIG. 1 depicts a duckbilled type check valve (generally 10) having a tubular entry 11, a shoulder 12, a neck 13 radially inwardly inset from the entry, a pair of flexible bill lips 14 and 15 with an outlet slit 16 formed there between, and (as shown in FIG. 4) a through passageway 18. As referenced by numeral 19 the lips 14, 15 taper towards each other.

Figure 3:
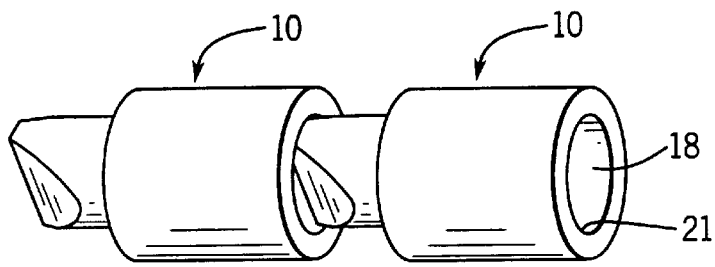
FIG. 3 is a perspective view showing two of the FIG. 1 duckbilled check valves in the process of being telescoped together.

Entry 11 is elongated at 21. As a result, when the lips 14 and 15 are nested into the inlet 18 (see FIGS. 3 and 4), the end of extension 21 will abut against shoulder 12 while (for example) an axially extending surface of the extension 21 jam fits against an axially extending surface of neck 13. Importantly, this leaves a gap 22 (see especially FIG. 4) so that the first duckbilled valve may open and close without interference from the "female" end of the second duckbilled valve. If desired, the check valves can be more permanently interlocked by use of an adhesive, sonic welding, or other techniques (with a contact point being between an inside surface of an extension 21 and an outside surface of a neck 13, or via a recess and projection interlock or other contact along surface 12).

As shown in FIG. 4, such assemblies can be inserted into conduit 26 so as to sealingly abut against narrowing 27. After insertion, additional conventional structures positioned at the inlet end of the check valve assembly (not shown) can be used to retain the check valve assembly in the conduit.

Figure 5:
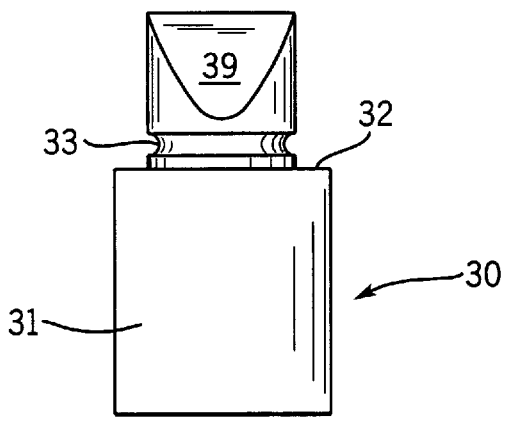
FIG. 5 is a view similar to FIG. 2, albeit showing a second embodiment of the preferred duckbilled check valve. Again, the rear elevational view of the check valve is identical to the front elevational view shown.
Figure 6:
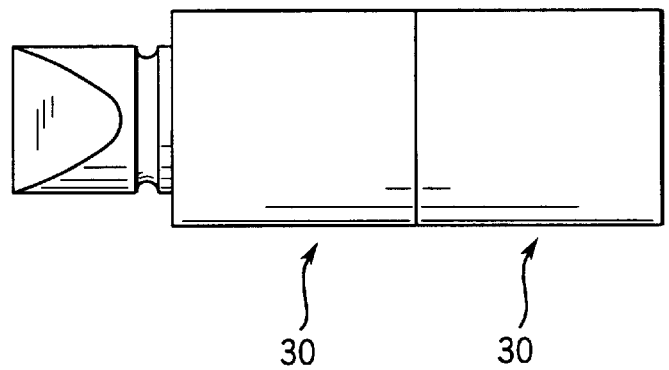
FIG. 6 is a view similar to that of FIG. 5, but with a second FIG. 5 duckbilled check valve nested within the first.
Figure 7:
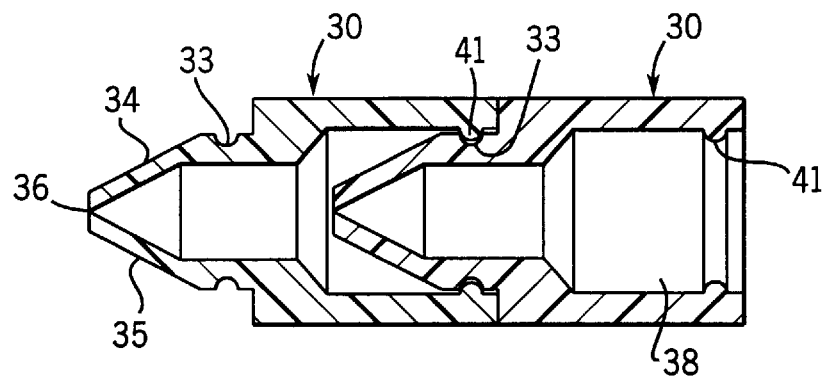
FIG. 7 is a sectional view through the FIG. 6 check valve assembly.

FIG. 5 shows an alternative check valve 30 that is useful in connection with the present invention. While it is similar to the first embodiment, the region of contact between the neck and extension has been modified to permit a snap fit connection.

There is a tubular entry 31, a shoulder 32, a neck 33, bill lips 34 and 35, and an outlet slit 36. However, the neck 33 has formed thereon an inwardly directed groove. The inlet 38 is formed with a radially inwardly directed bead 41 which is suitable to snap fit into neck groove 33.

This embodiment provides a secure interlocking between the duckbills without the need for adhesives, welding, or an extremely tight jam fit that might require close tolerances. It also enhances the seal between the two check valves due to the serpentine junction between bead 41 and groove 33.

Water flow from right to left in the conduit 26 shown in FIG. 4 will cause both duckbills to open such that flow is not prohibited. Reverse flow is prevented even if one of the duckbills should be jammed open by debris.

Duckbilled check valves useful in connection with the present invention can be formed using a variety of conventional molding techniques known in the art (e.g. injection molding).

A preferred check valve in accordance with the present invention has a diameter of between 6.6 mm and 6.76 mm at the tubular entry, an overall axial length of between 12.57 mm and 12.83 mm, and a bill with an axial length of between 4.95 mm and 5.21 mm. 1.9 to 1 overall length to diameter ratios for each individual check valve are preferred. In any event, the axial length of the bill of the first valve should be shorter than the axial length of the inlet cavity of the other valve.

Various elastic materials can be used to form the valves of the present invention such as Santropreme® 35 available from Advance Elastomer Systems.

The assembly is particularly useful in extremely compact products such as garden hose nozzles. Further, since both duckbills can be essentially the same, two separate molds are not required to form them.

The preceding description is merely of preferred embodiments of the invention. Alternative embodiments also fall within the scope and breadth of the invention. For example, the dimensions of the assembly (and each check valve) may be modified, and such assemblies may be used in a wide variety of different applications apart from those involving water. For example, they can be used in systems that carry high pressure gasses or other liquids. Further, other means of interlocking the valves until the check valve system is at least installed may be used (such as threads or a bayonet type connection). Moreover, more than two of these valves may be stacked in this manner for still further safety. Thus, the claims should be looked to in order to understand the full scope of the invention.

INDUSTRIAL APPLICABILITY

Check valve assemblies are provided to enhance back flow protection in conduits. Such check valves are particularly useful in connection with compact nozzles.

We claim:

1. A check valve assembly, comprising:
   a first duckbilled check valve having an inlet at one end, an elastomeric bill formed at an opposite end, and a neck therebetween, the bill having opposed lips and an outlet openable by a flexing of the lips apart;
   a second duckbilled check valve having an inlet at one end, an elastomeric bill formed at an opposite end, and a neck therebetween said bill of the second duckbilled check valve also having opposed lips and an outlet openable by a flexing of its lips apart;
   wherein the bill of the first duckbill check valve is telescoped into and retained in the inlet of the second duckbilled check valve with the lips of the first valve able to move outward inside the inlet of the second valve; and
   wherein the bill of the first duckbill check valve is held in a nested together configuration with the inlet of the second duckbilled check valve by a snap fit connection between the neck of the first duckbill check valve and the inlet of the second duckbill check valve.

2. The check valve assembly of claim 1, wherein the first duckbilled check valve has a radially inwardly directed groove on its neck, and the second duckbilled check valve has a radially inwardly directed projection inside its inlet.

3. A method of preventing back flow in a conduit, comprising positioning a check valve assembly of claim 1 in a conduit.

4. A check valve assembly, comprising:
   a first duckbilled check valve having an inlet at one end and an elastomeric bill formed at an opposite end, the bill having opposed lips and an outlet openable by a flexing of the lips apart;
   a second duckbilled check valve having an inlet at one end and an elastomeric bill formed at an opposite end, said bill of the second duckbilled check valve also having opposed lips and an outlet openable by a flexing of its lips apart;
   wherein the bill of the first duckbill check valve is telescoped into and retained in the inlet of the second duckbilled check valve;
   wherein the two check valves have identical structure.

* * * * *